United States Patent
Agrawal et al.

(10) Patent No.: US 12,430,650 B2
(45) Date of Patent: Sep. 30, 2025

(54) SELF-AWARE CRYPTOCURRENCY WALLETS

(71) Applicant: Western Digital Technologies, Inc., San Jose, CA (US)

(72) Inventors: Shashank Agrawal, San Jose, CA (US); Cyril Guyot, San Jose, CA (US); Evan Drake, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 299 days.

(21) Appl. No.: 18/157,747

(22) Filed: Jan. 20, 2023

(65) Prior Publication Data

US 2023/0289806 A1    Sep. 14, 2023

Related U.S. Application Data

(60) Provisional application No. 63/318,523, filed on Mar. 10, 2022.

(51) Int. Cl.
G06Q 20/40 (2012.01)
G06Q 20/36 (2012.01)
G06Q 20/38 (2012.01)

(52) U.S. Cl.
CPC ..... *G06Q 20/4016* (2013.01); *G06Q 20/3678* (2013.01); *G06Q 20/3825* (2013.01); *G06Q 20/3827* (2013.01); *G06Q 20/3829* (2013.01); *G06Q 20/389* (2013.01); *G06Q 2220/00* (2013.01)

(58) Field of Classification Search
CPC ........... G06Q 20/4016; G06Q 20/3678; G06Q 20/3825; G06Q 20/3827; G06Q 20/3829; G06Q 20/389

USPC ........................................................ 705/69
See application file for complete search history.

(56) References Cited

U.S. PATENT DOCUMENTS

| | | | |
|---|---|---|---|
| 10,878,248 B2 | 12/2020 | Raspotnik, Jr. | |
| 2017/0352031 A1 | 12/2017 | Collin | |
| 2019/0139136 A1 | 5/2019 | Molinari et al. | |
| 2020/0136837 A1 | 4/2020 | Phatigaraphong et al. | |
| 2020/0193441 A1* | 6/2020 | Mokhasi | G06Q 20/4012 |
| 2021/0021410 A1 | 1/2021 | Offenberg et al. | |
| 2021/0073795 A1 | 3/2021 | Ruiz et al. | |
| 2021/0132826 A1 | 5/2021 | Kwok et al. | |

(Continued)

*Primary Examiner* — Courtney P Jones
(74) *Attorney, Agent, or Firm* — Barry IP Law, P.C.

(57) ABSTRACT

Systems, methods, and devices described herein can configure a cryptocurrency wallet or other blockchain-based account to be self-aware and alert the owner of the wallet to one or more potentially fraudulent situations occurring with at least one account they own. The wallet may be a hardware-based cryptocurrency wallet or may be a blockchain-based account operating by an external financial institution that allows for the management of cryptocurrency assets. The self-aware wallet can be configured to track all relevant previously known and/or approved transactions associated with a user's private cryptocurrency key. A subsequent scan on one or more blockchains is performed to detect new transactions associated with the user's private key. If a newly detected blockchain transaction is not in the list of previously known or approved user transactions, a potential compromise may be occurring. Once detected, the wallet can generate a notification to the user alerting them to the issue.

20 Claims, 6 Drawing Sheets

(56) References Cited

U.S. PATENT DOCUMENTS

| | | | |
|---|---|---|---|
| 2021/0157916 A1* | 5/2021 | Stiles | G06F 21/6245 |
| 2021/0350368 A1* | 11/2021 | Young | G06Q 20/401 |
| 2023/0108083 A1* | 4/2023 | Ramabaja | H04L 9/50 |
| | | | 705/75 |
| 2024/0193584 A1* | 6/2024 | Gagne-Keats | G06Q 20/3672 |

* cited by examiner

SELF-AWARE CRYPTOCURRENCY WALLETS

FIELD

The present disclosure relates to hardware wallets. More particularly, the present disclosure relates to configuring a cryptocurrency wallet to detect potential compromises of accounts stored within the wallet.

BACKGROUND

Blockchain technologies have revolutionized many aspects of our society. By sharing and generating an immutable ledger across an entire network, various actions can occur such as tracking an asset to specific owners at various points in time. An asset can be tangible like cash or intangible such as intellectual property or non-fungible tokens. Almost any type of item that has value can be tracked and traded via transactions on a blockchain network which can be designed to reduce risk and lower costs for the parties involved.

The transactions are compiled into a recorded set of data, including hashes, which may be defined as a block and comprise various data related to the compiled transactions such as the who, when, where, and how any action should or did happen. Each generated block is connected to the one before to create a chain of blocks, or blockchain. Copies of the blockchain are kept in parity across a large network of hosts and through various means, new blocks are generated, added, and promulgated across each copy of the ledger across the network.

However, malicious actors may attempt to hijack and steal various blockchain-based accounts such as crypto-wallets and use any available and associated funds, such as those within a blockchain-based wallet. In most cases, transactions of stolen accounts occur within a blockchain after being improperly accessed. Often, when these attempts are successful and the transactions have occurred, the original owner of the account may not be made aware of the heist until they attempt to use the stolen funds at a later time.

Any kind of key compromise of a crypto wallet or other blockchain-based account can be devastating for crypto users, large or small, because it directly translates to loss of funds. Whoever has the key associated with an account can spend all the funds in it, so it's very important to detect any compromise as early as possible. If a compromise is detected in the early stages, a user can transfer the remaining funds to a different address, move the uncompromised keys to a new location, etc. On the flip side, if a compromise goes unnoticed for a long time, the attacker may slowly drain away the entirety of the funds associated with the keys at the compromised location, leaving absolutely nothing for the victim to salvage.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

In response to various problems such as those described above, devices and methods are discussed herein that provide for self-aware crypto wallets or other blockchain-based accounts that can notify a user when a new suspicious transaction on the blockchain has been detected. In this way, a user may be able to reverse or at least defer any additional losses by securing their affected account. In many embodiments, this can be realized on a cryptocurrency wallet, or "crypto wallet." In additional embodiments, these methods may also be applied within a blockchain-based account such as, but not limited to, online brokerages or other accounts that allow users to buy, sell, or otherwise manage cryptocurrencies. Crypto wallets are often configured to hold cryptocurrencies and may come in various different forms like hardware wallets, software wallets, mobile apps, or be browser-based, etc. Often, their primary purpose is to hold and use keys, such as crypto keys or private keys in a secure manner. A single wallet or blockchain-based account can hold multiple keys for one or more cryptocurrencies.

The primary use of crypto keys is to sign transactions: a signature under a public address shows possession of the corresponding secret key. Transactions not only move funds between crypto accounts, but they also create contracts, execute those contracts, etc. When a transaction is published on a blockchain network, it starts out in a pending state. When the transaction is incorporated into the associated blockchain in a particular block X (the first block confirmation), it switches to a confirming state. After a certain number of blocks have been added on top of X (the number of block confirmations can depend on the specific blockchain, network conditions, etc.), the transaction is considered to be confirmed. A transaction can be considered unconfirmed if it's in either pending or confirming state. A confirming transaction could revert back to the pending state if the blockchain rolls back to the parent of the block containing that transaction.

In many embodiments described herein, a "self-aware" wallet can be configured to detect a potential compromise on its own, without user intervention. In certain embodiments, the self-aware wallet can keep track of all of its unconfirmed transactions (i.e., pending or confirming transactions). In further embodiments, the wallet can synchronize with a blockchain at regular intervals. If a transaction is monitored on the blockchain that is signed under or otherwise associated with one of the keys within the self-aware wallet but is not in a list of pending or previously known transactions, then the user can be alerted. The frequency of syncing with the blockchain can be configured to determine how soon a compromise is detected: the higher the rate of syncing, the sooner a compromise will be detected.

In various embodiments, hardware wallets can be utilized as self-aware wallets. Hardware wallets can be considered to be one the most secure form of wallets because they store keys, such as crypto keys or private keys on a piece of hardware that is separate from your phone, laptop, etc. Moreover, the wallets never release secured material and often only allow a limited set of operations. Even if there is some malware on a user device that the wallet connects to, it won't be able to affect anything directly on the wallet.

Typically, a hardware wallet generates keys, stores them, and signs transactions with them. In various embodiments, it could also have a display and some buttons to show transaction details to the user and get his/her confirmation. There is usually a separate piece of software that comes with these wallets to connect with blockchain networks, sync with them, monitor transactions, etc. This software is meant to run on the device the wallet is plugged into (or connected to), which can be a host device.

Digital signatures schemes are designed to work with data of any size. Though the signature is on the entirety of data, it's often only a hash of the data (e.g., ECDSA). A collision-resistant hash function is used to ensure that no two different pieces of data hash to the same value. As a result, in many embodiments, keeping track of transactions a wallet has signed, we only need to track the hashes of those pieces. These transactions are often stored and processed as transaction data. This transaction data can include a hash of the transaction.

In some embodiments, hashes of all pending transactions can be configured into a hash map/table (confirming transactions could be in a separate data structure) which may be stored within the wallet. In certain embodiments, for every new block that appears on the chain, the wallet can be configured to go over every transaction in the block and check whether the transaction has been signed under or is otherwise associated with one the keys associated with the blockchain-compatible wallet/account. If such a transaction is found but the hash of the transaction is not in the hash map/table, then the user can be alerted of the suspicious transaction and possible account compromise.

In order to aide in the evaluation/comparison of the monitored blockchain data and the previously stored transactions, various computational methods, such as filters, may be utilized. In some embodiments, a Bloom filter can be used. A Bloom filter is a space-efficient probabilistic data structure used to test whether an element is a member of a set or not. Bloom filters do not have any false negatives (if the filter tells you that an element is not in the set, then it's indeed not there) but it could have some false positives. False positives can be a problem for use: if the filter says that (the hash of) a blockchain transaction is in the set of pending transactions but actually it's not, then the user will not be alerted. Fortunately, the false positive probability can be minimized. Generally speaking, fewer than 10 bits per element are required for a 1% false positive probability, independent of the size or number of elements in the set. Utilizing these filters can allow for an efficient evaluation of new transaction data, such as data within a newly pending block.

However, most blockchains are public in nature. To include a transaction in a blockchain, the transaction is broadcast on the blockchain network, and anyone can see it. So, if a Bloom filter is used in a simple manner, the internal state of the filter can be computed by anyone (i.e., the state of the filter after all the pending transactions are inserted). For example, suppose an attacker was able to steal the secret key for a certain address and wants to drain all the funds from it. They actually have a lot of flexibility in creating a transaction for this purpose. If the address has some amount of funds, the attacker can choose any recipient address and any amount close to the fund total for the transaction. As a result, the attacker can create thousands of transactions which effectively do the same thing. Now, one by one, they will hash those transactions and check if the hash is present in the victim's Bloom filter. Soon enough, the attacker will find a transaction that will be reported by the filter to be present in it, even though it's not (a false positive). The attacker will now publish that transaction on the network. Even if the transaction is added to the blockchain, the wallet will not alert the user. To thwart this attack, various embodiments can include some secret randomness into the Bloom filter. In some embodiment, a uniformly random value is picked and hashed with the transactions before inserting them into the filter. This may be reversed easily by the user but not an attacker.

Finally, bloom filters are not the only choice to succinctly represent a set of elements. Cuckoo filters are another space-efficient probabilistic data structure that is used to test whether an element is a member of a set. Unlike Bloom filters, cuckoo filters also allow for deletion of existing elements. In addition, a newly proposed filter called an XOR filter may be faster and smaller than either the Bloom or Cuckoo filters.

Figure 1:
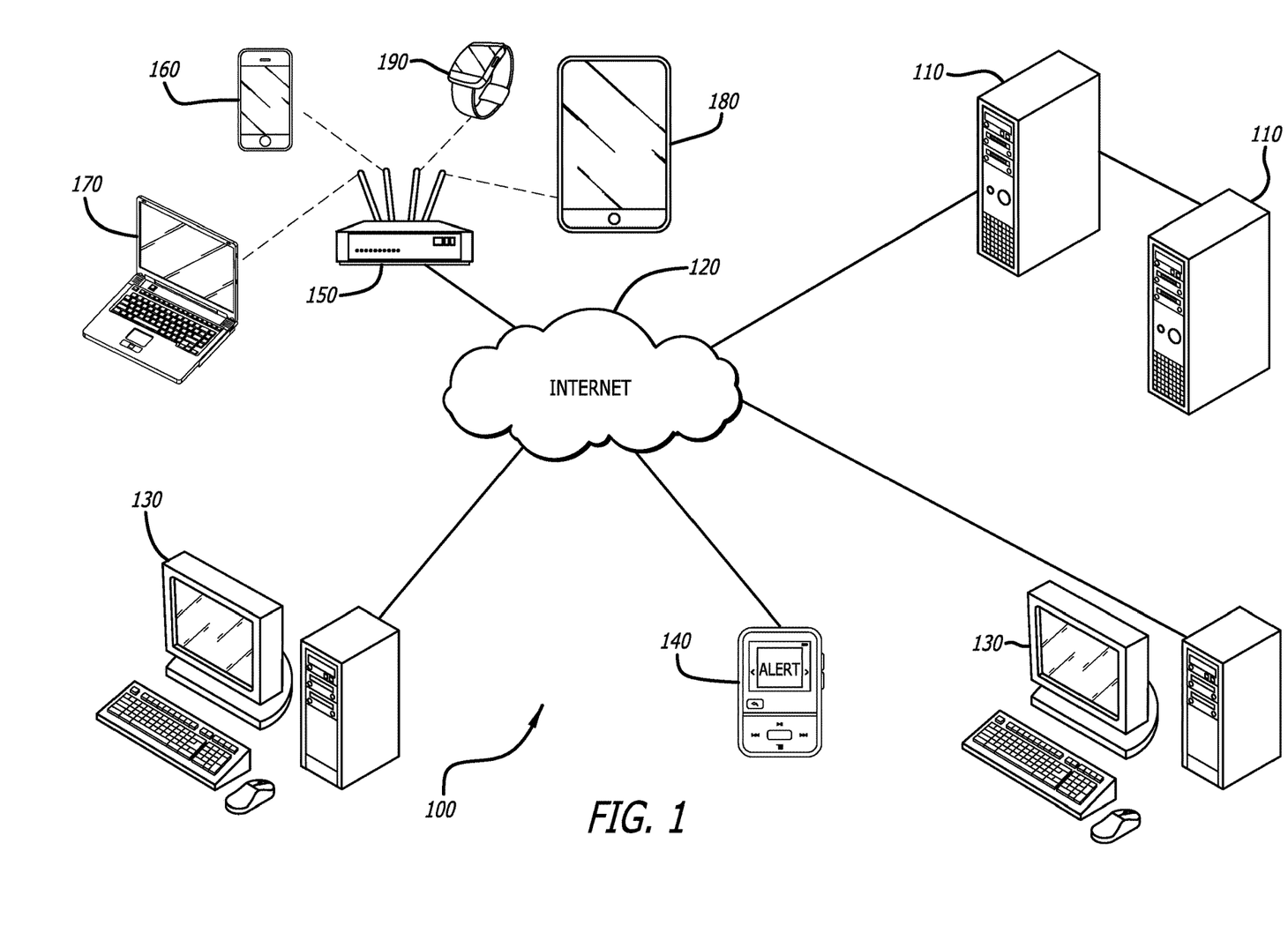
FIG. 1 is a conceptual diagram of a self-aware wallet system in accordance with various embodiments of the disclosure.

Referring to FIG. 1, a conceptual diagram of a self-aware wallet system 100 in accordance with various embodiments of the disclosure is shown. The self-aware hardware wallet system 100 may comprise a plurality of devices, such as a self-aware hardware wallet 140 that can be configured to transmit and receive data related to providing, recording, and processing or otherwise transacting with one or more private keys associated with blockchain-based accounts. In many embodiments, servers 110 can be connected to a network 120 such as, for example, the Internet. Servers 110 are configured to transmit a variety of data across the network 120 to any number of computing devices such as, but not limited to, self-aware hardware wallets 140, personal computers 130, and mobile computing devices including laptop computers 170, cellular phones 160, portable tablet computers 180 and wearable computing devices 190. In additional embodiments, transaction and/or compromise alert data may be mirrored in additional cloud-based service provider servers or edge network systems. In still additional embodiments, the servers 110 can be hosted as virtual servers within a cloud-based service.

In further embodiments, the sending and receiving of transaction and/or compromised alert data can occur over the network 120 through wired and/or wireless connections. In the embodiment depicted in FIG. 1, the mobile computing devices 160, 170, 180, 190 are connected wirelessly to the network 120 via a wireless network access point 150. For example, a user can be notified on multiple devices about a potential compromise. It should be understood by those skilled in the art that the types of wired and/or wireless connections between devices on the self-aware wallet system 100 can be comprised of any combination of devices and connections as needed.

In various embodiments, the self-aware wallet system 100 may broadly accept and/or process new transaction and/or compromise alert data from any number of blockchains or other self-aware hardware wallets 140, as well as personal computers 130, and/or mobile computing devices 160, 170, 180, 190. This data related to the alerts or transactions can be generated from and/or stored within the self-aware hardware wallet 140, personal computers 130, and/or mobile computing devices 160, 170, 180, 190. In other embodiments, the transaction may be conducted based on data received from one or more servers 110 or other blockchain networks or nodes.

In still further embodiments, the transaction and/or alert data may be stripped of personal identifying data (i.e., anonymized) and transmitted to the servers 110 and/or other cloud-based services for processing. The processed data may then be returned to a self-aware hardware wallet 140, one or more personal computers 130, and/or mobile computing devices 160, 170, 180, 190 for output to the user. Based on the transaction type occurring, the user of the self-aware hardware wallet 140 may subsequently generate alert response data that can be verified or utilized to respond to the alert. These responses may be preconfigured and based on the type of potential compromise found and/or the amount of time that has elapsed between the compromise detection and the response.

Figure 2:
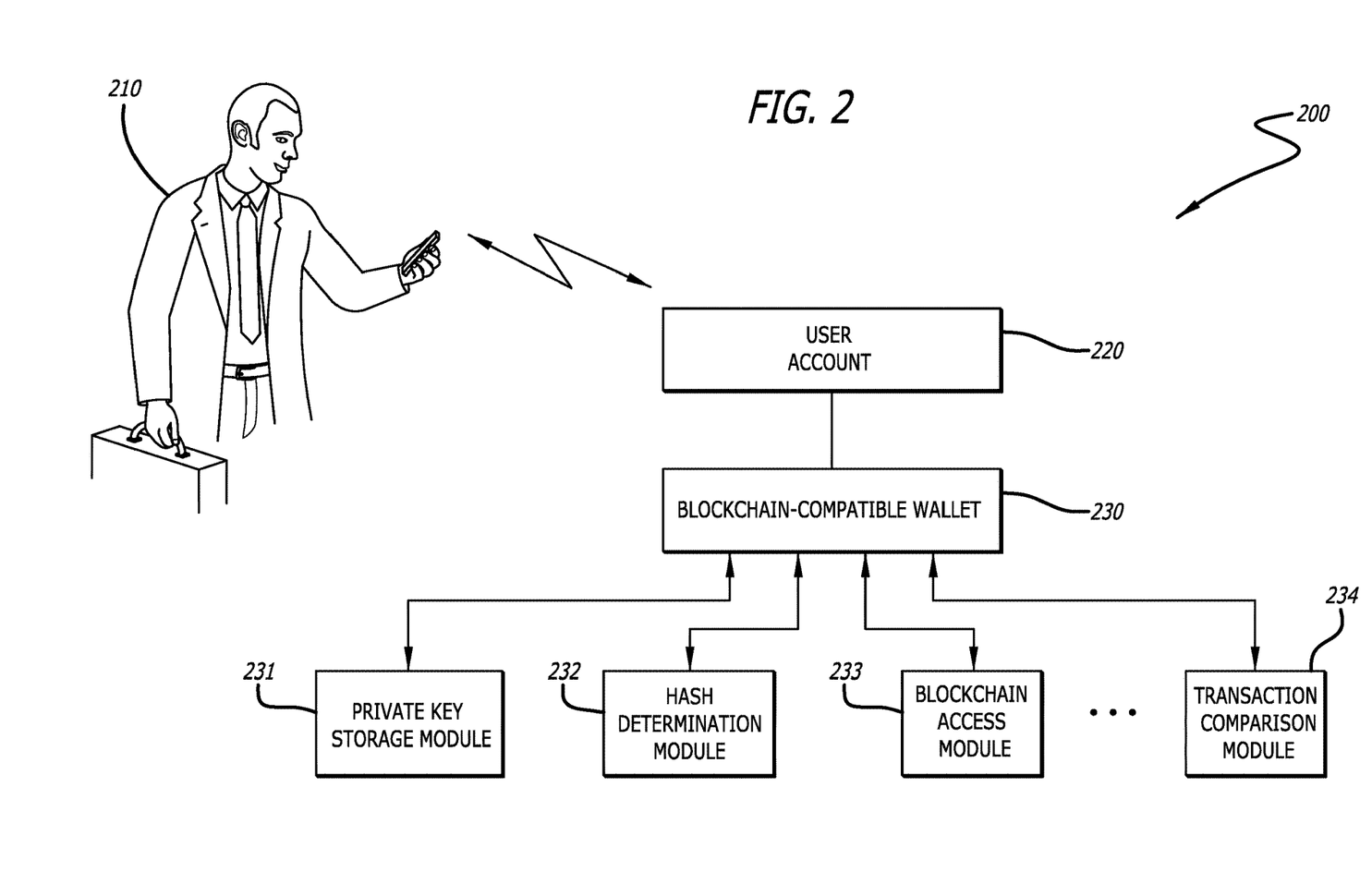
FIG. 2 is an abstract illustration of a user-level self-aware wallet environment comprising a user interacting with a self-aware wallet in accordance with various embodiments of the disclosure.

Referring to FIG. 2, an abstract illustration of a user-level self-aware wallet environment 200 comprising a user interacting with a self-aware wallet in accordance with various embodiments of the disclosure is shown. In many embodiments, a user 210 will interact with the self-aware wallet system 100 through a device such as a personal or mobile computing device 160 or hardware wallet 140 as described in FIG. 1. The device may allow access to one or more user accounts 220. Often, the user account 220 provides private key management. In certain embodiments, the private key is utilized within one or more blockchains.

Additionally, upon generation of the user account, a blockchain-compatible wallet 230 associated with the user can be deployed on or associated with one or more blockchains. In certain embodiments, the user may already have a previously deployed blockchain-compatible wallet 230 that is transferred or reconfigured for use within the self-aware wallet system 100. However, certain requirements may need to be established before utilization or conversion may begin. Once properly deployed, the blockchain-compatible wallet 230 may store keys in addition to holding user tokens or other portfolio assets. It can be configured such that only the user can initiate changes, transactions, or other methods via their user account 220. This is often done through the use of a private key only the user has access to.

The blockchain-compatible wallet 230 can also be configured to interact with or comprise a plurality of modules 231-234 which can facilitate the self-ware methods described herein. In a number of embodiments, a private key storage module 231, can be configured to store keys including private keys or cryptographic keys ("crypto keys"). The storage of these keys can be done such that they are secured and separate from other modules or logics within the device. Similarly, access to the stored keys can be limited to the owner of those keys through various access protection methods.

In further embodiments, a hash determination module 232 may determine any transaction data that is associated with any of the stored keys within the private key storage module 231. In many embodiments, the transaction data includes hashes of previous transactions that have occurred using a particular key. Since most public blockchain transactions are public, every transaction from now back until the start of the blockchain can be evaluated and examined. Each transaction that is represented in the blockchain (often a hash of that transaction), can be searched. When a transaction is determined to have occurred with the key being processed, the associated transaction data (often a hash of that transaction) can be stored locally within the device or otherwise associated with that key. Because blockchain-compatible wallets can be configured to store multiple keys that operate over various different blockchains, this process can be repeated for each new key added to the wallet or associated user account 220. As described above, certain embodiments can utilize data obfuscation techniques within the hash determination module 232 such as the use of a filter to keep attackers from circumventing these techniques. Finally, this process can occur upon addition to the blockchain-compatible wallet 230, or it may occur in the background over time when a sufficient connection and/or processing resources are available.

In additional embodiments, a blockchain access module 233 can be configured to provide access to one or more blockchain for various purposes. In some embodiments, the blockchain access module 233 provides access to the hash determination module 232 in order to facilitate scanning for previous transactions associated with a key stored in the private key storage module 231. The blockchain access module 233 can utilize a network connection, including, but not limited to Bluetooth, LAN, Wi-fi, or other wireless communication protocol within the device to provide that access. In some embodiments, special logic may be needed and can be provided by the blockchain access module 233 to interface and read data from one or more blockchains.

Finally, a transaction comparison module 234, can facilitate the determination of whether a private key has been potentially compromised. In various embodiments, this can be accomplished by comparing unconfirmed transaction on a blockchain associated with a key stored in the private key storage module 231 with previous transactions that have occurred, or in the process of occurring, with the hash determination module 232. When an unknown transaction is found on the blockchain, a notification can be generated to the user notifying them of a potential attack on their keys and/or associated user account 220. This generation can be done via any typical notification process such as, but not limited to, emails, texts, or pop-ups on various devices connected over one or more protocols such as Wi-Fi or ethernet.

Figure 3:
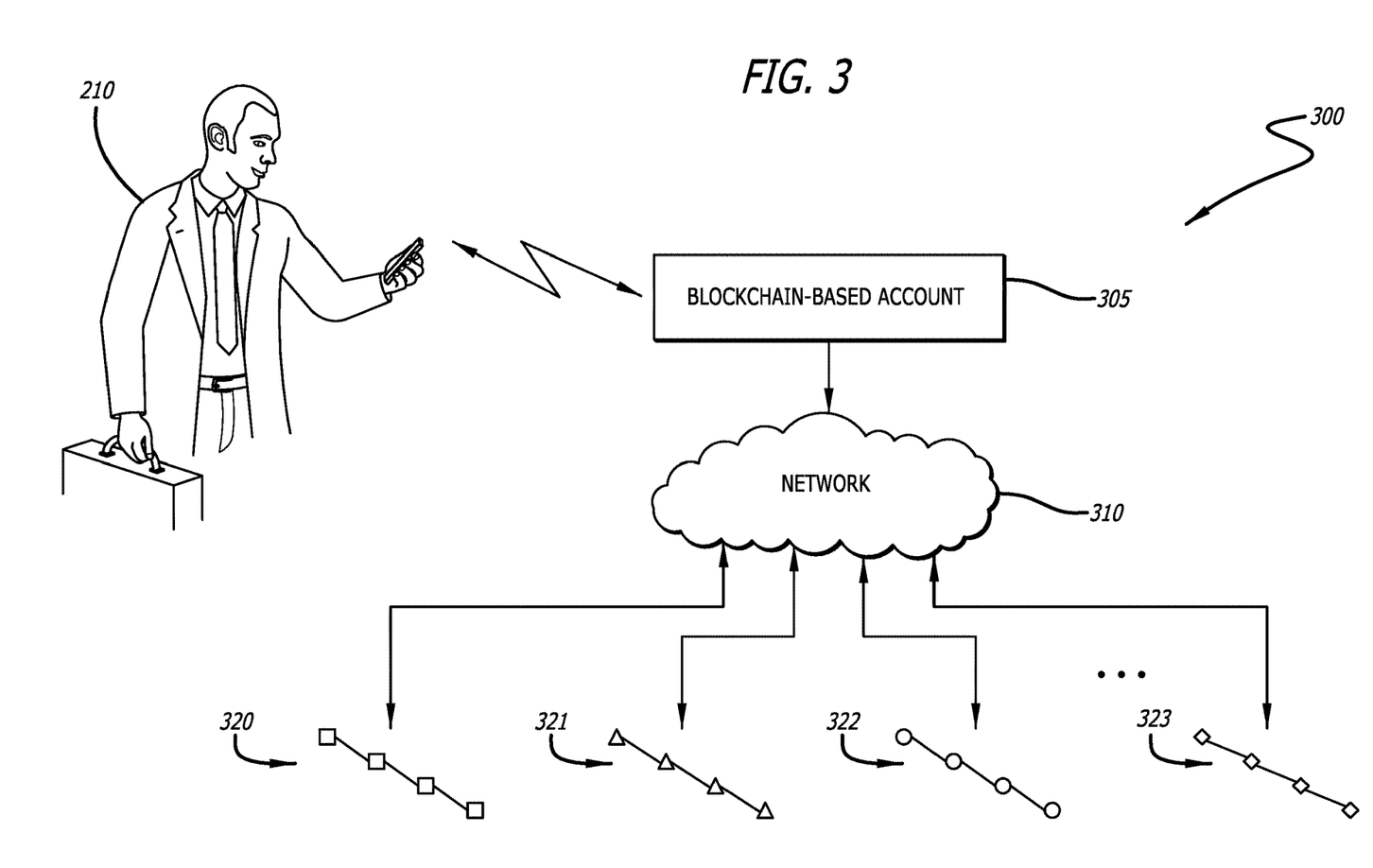
FIG. 3 is an abstract illustration of a self-aware wallet environment comprising a blockchain-based account 305 interacting with a plurality of blockchains in accordance with various embodiments of the disclosure.

Referring to FIG. 3, an abstract illustration of a self-aware wallet environment 300 comprising a blockchain-based account 305 interacting with a plurality of blockchains 320-323 in accordance with various embodiments of the disclosure is shown. A blockchain-based account 305 can be similar to a user account 220 with a blockchain-compatible wallet 230 as described in FIG. 2. In certain embodiments, a blockchain-based account may be an account with fewer features than a user account 220 which may be part of a larger financial account. It should be understood that the blockchain-based account can be configured similarly with the blockchain-compatible wallet 230 and all of the corresponding modules 231-234.

In various embodiments, the blockchain-based account 305 can connect over a network 310 such as the Internet to a plurality of blockchains 320-323. These connections can be accomplished through a network connection, such as one provided by or coordinated by a blockchain access module 233. The blockchain-based account 305 can initially scan each of the plurality of blockchains 320-323 (including a first blockchain 320, second blockchain 321, third blockchain 323, and fourth blockchain 323) to determine any previous transactions with keys associated with the blockchain-based account 305 and store that data locally. In further embodiments, the blockchain-based account 305 can monitor each blockchain for new unconfirmed blocks and unconfirmed transactions associated with those unconfirmed blocks. This monitoring can occur periodically over a predetermined time period. When a new unconfirmed transaction within a new unconfirmed block is found, the blockchain-based account 305 can evaluate it to see if any fraudulent activity is occurring, as described in more detail throughout this disclosure.

Figure 4:
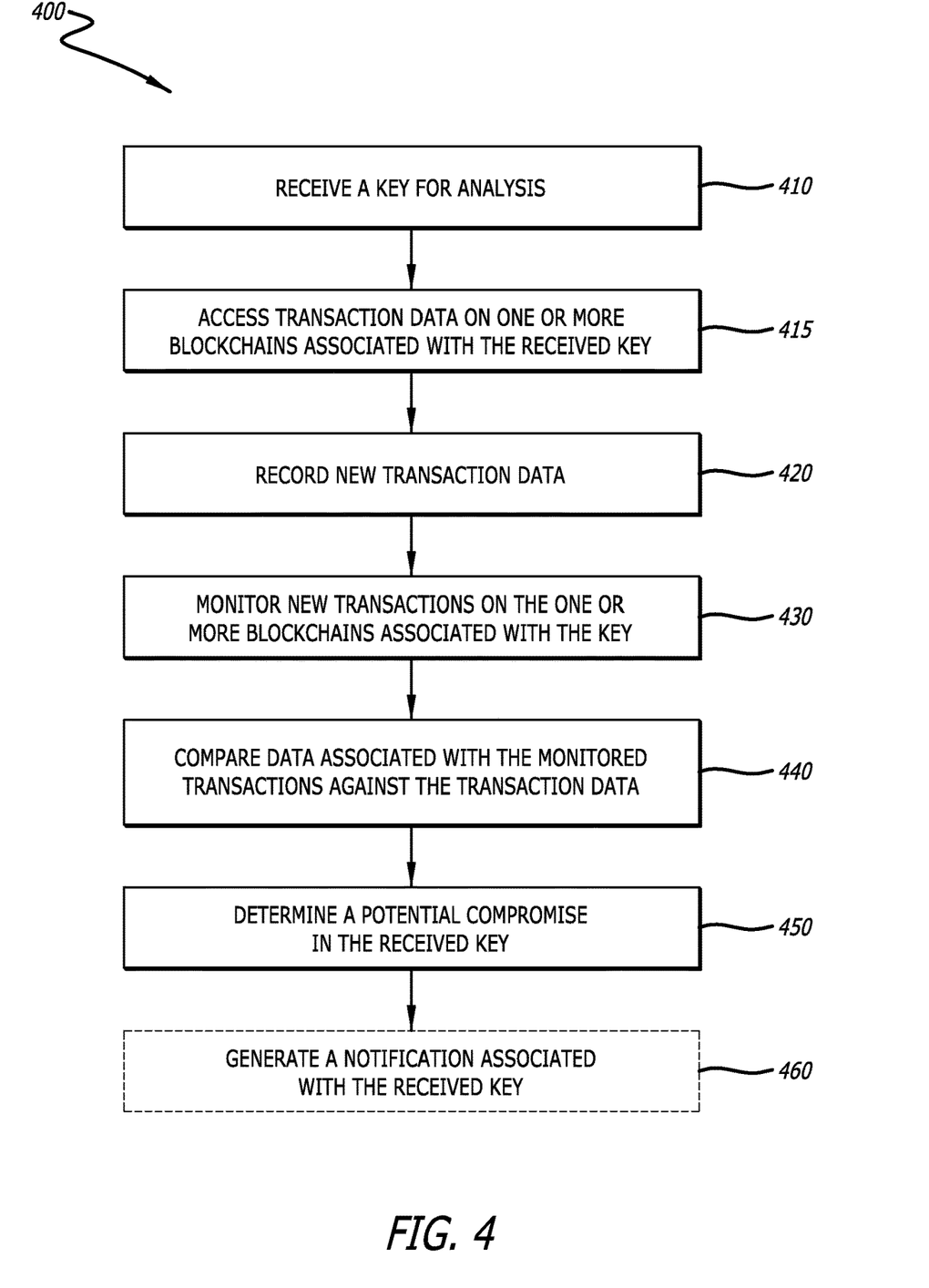
FIG. 4 is a flowchart depicting a process for determining potential compromises of a key in accordance with various embodiments of the disclosure.

Referring to FIG. 4, a flowchart depicting a process 400 for determining potential compromises of a key in accordance with various embodiments of the disclosure is shown. In many embodiments, the process 400 will begin when a key is received for analysis (block 410). As described above, the key may be a private key, cryptographic key, and/or a cryptocurrency-related key. The received key is often a new key added by a user to a blockchain-based account or blockchain-compatible wallet such as a cryptocurrency wallet.

In certain optional embodiments, the process 400 can access data on one or more blockchains associated with the received key (block 415). As previously described, blockchains include data related to all previous transactions that occur on that blockchain. Each received key is associated with a particular blockchain. The blockchain can be accessed to determine any transactions that involved a received key. These transactions can be stored within the blockchain-based account or cryptocurrency wallet. However, in some embodiments, only recent transactions are accessed and stored.

During normal use, the owner of the blockchain-based account or cryptocurrency wallet can create new transactions. These new transactions subsequently generate new transaction data associated with the received key. Therefore, many embodiments can record new transaction data as it is generated (block 420). New transaction data that is generated within the blockchain-based account and/or cryptocurrency wallet is presumed to be valid and legitimate.

The process 400 can monitor new transactions on the one or more accessed blockchains associated with the received key (block 430). When monitored transactions are found, the process 400 can compare the data associated with the monitored transactions against the transaction data previously stored or accessed from the one or more blockchains (block 440). This comparison can produce a positive or negative result depending on if certain data is present. In various embodiments, the data includes a hash that is compared against previously stored hashes. Based on this result, the process 400 can determine if a potential compromise in the received key has occurred (block 450) such as an unauthorized transaction occurring. Once determined, a notification associated with the potentially compromised key can be generated and sent to the user (block 460). However, in other embodiments, one or more alternative actions may occur.

Figure 5:
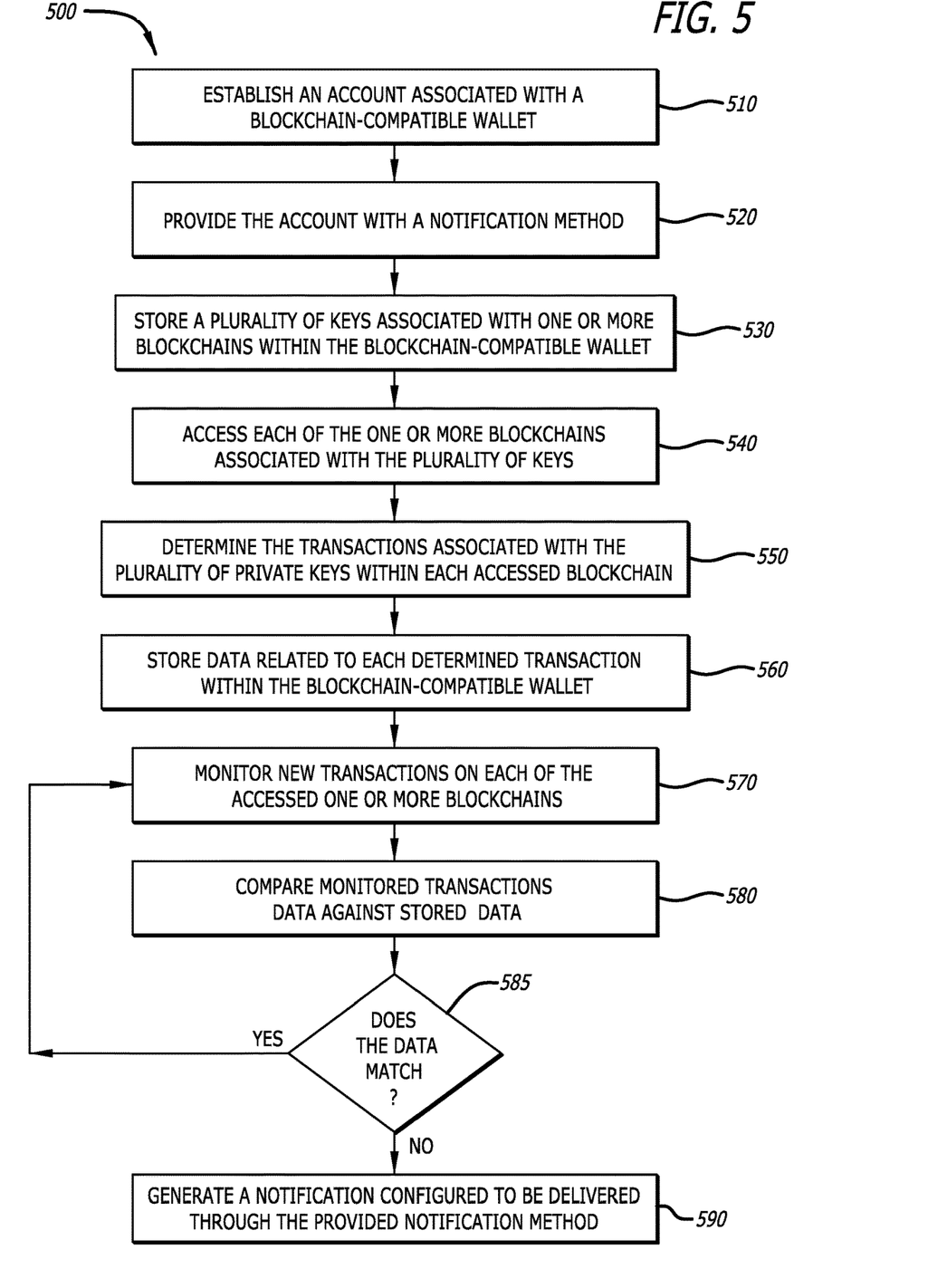
FIG. 5 is a flowchart depicting a process for operating self-aware blockchain-compatible wallets in accordance with various embodiments of the disclosure.

Referring to FIG. 5, a flowchart depicting a process 500 for operating self-aware blockchain-compatible wallet, in accordance with various embodiments of the disclosure is shown. As described above, the blockchain-compatible wallet can be a cryptocurrency wallet, such as a hardware or software wallet configured to handle and manage cryptocurrency keys. In many embodiments, the process 500 can begin when a user establishes an account associated with a blockchain-compatible wallet (block 510). This can be a user account shown in FIG. 2 but may also be a blockchain-based account in certain instances. During creation of the account, or at some subsequent point, a notification method can be provided and stored within the account (block 520). For example, the user may provide an email address or phone number to receive automated text messages or calls, etc.

In more embodiments, the process 500 can store a plurality of keys associated with one or more blockchains within the blockchain-compatible wallet (block 530). As those skilled in the art will recognize, each key, such as a private key, can be utilized with a particular blockchain. Each blockchain-compatible wallet can store multiple keys, so a user may need to access multiple blockchains with a single blockchain-compatible wallet. For each blockchain associated with the keys, the process 500 can access the blockchains associated with the plurality of keys (block 540).

Once accessed, the process 500 can determine the transactions associated with the plurality of private keys within each accessed blockchain (block 550). In many embodiments, the process 500 can scan each of the transactions throughout the history of the blockchain and copy data related to transactions that utilized the current key being processed. In other embodiments, the scanning may occur only on a limited set of recent transactions. Often, each transaction that is stored has a related hash within a block of the blockchain. In some embodiments, the process 500 can store the hash-based data related to each determined transaction within the blockchain-compatible wallet (block 560). This can allow for quick subsequent comparisons. In additional embodiments, the user may utilize the blockchain-compatible wallet to generate new transactions during normal use. These new transactions can also be stored as valid transaction data.

In a number of embodiments, the process 500 can monitor new transactions on each of the accessed one or more blockchains (block 570). In some embodiments, the process 500 can monitor each blockchain for every new unconfirmed block is added to the blockchain. In additional embodiments, an outside service may provide a notification that indicates a new unconfirmed block is present. The process 500 can compare the monitored transactions and associated data with the stored hash-based data of previous transactions (block 580).

The process 500 can then determine if the data matches (block 585). Often, this matching can be examining if a new transaction is associated with the plurality of keys and if so, if that new transaction is in the list of previously known or approved transactions. If the data does match, meaning that the transaction is either not associated with the plurality of keys or if it is, that the transaction is known or previously approved, the process 500 can continue monitoring new transactions within the blockchain (block 570). However, when the data does not match, the process 500 can generate a notification configured to be delivered through the provided notification method (block 590). The notification can be formatted to inform the user that a pending transaction on the blockchain is not in the previously known and/or approved list of valid transactions. In most embodiments, this method of notification can be the method outlined when creating or updating the account associated with the blockchain-compatible wallet.

Figure 6:
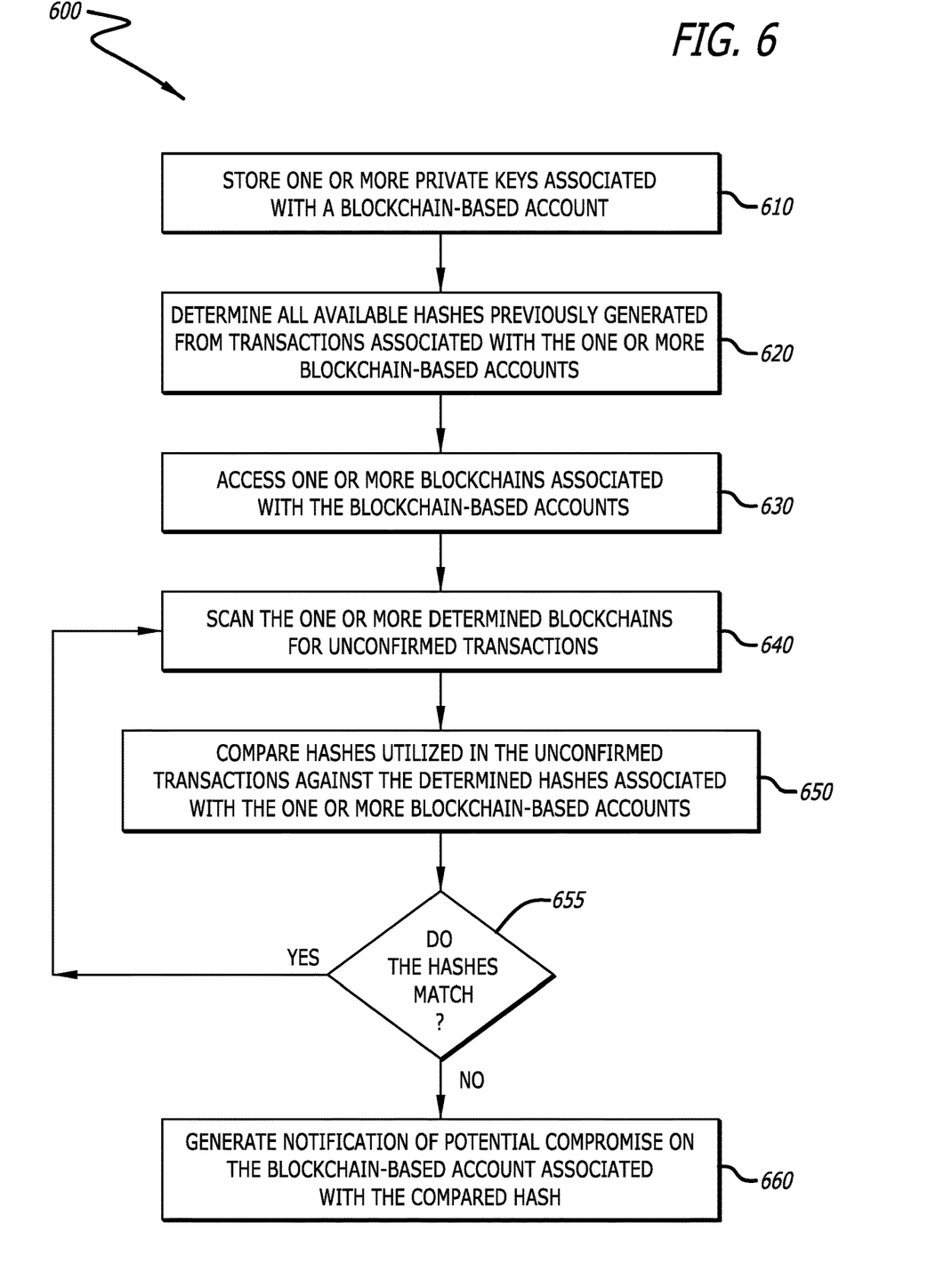
FIG. 6 is a flowchart depicting a process for detecting compromised blockchain-based accounts via a self-aware wallet in accordance with various embodiments of the disclosure.

Referring to FIG. 6, a flowchart depicting a process 600 for detecting compromised blockchain-based accounts in accordance with various embodiments of the disclosure is shown. In many embodiments, this process 600 can be implemented on an exchange or other online account system that allows users to buy, sell, and/or manage various currencies, including cryptocurrencies, wherein the self-aware functions are implemented through one or more logics operating on the device or within a remote server. In more embodiments, the process 600 can commence upon the secure storage of one or more private keys or other account information associated with a blockchain-based account within the blockchain-based account (block 610). As discussed above, a blockchain-based account may be functionally different from a user account with a blockchain-compatible wallet. In certain embodiments, a hardware wallet may be configured as a standalone blockchain-compatible wallet, whereas a blockchain-based account may, for example, be a part of a larger user account that can be operated by an external financial institution.

Once stored, the blockchain-based account can begin to determine all available hashes that were previously generated from past transactions associated with the one or more blockchain-based accounts (block 620). However, in certain embodiments, the process 600 may only determine a limited number of recent transactions and associated hashes. These determined hashes can be stored within the blockchain-based accounts in certain embodiments. Typically, each private key is associated with a particular blockchain. The blockchain-based account can access one or more blockchains associated with each of the user's private keys (block 630). Utilizing this determination, the process 600 can access and scan the one or more determined blockchains for new or unconfirmed transactions (block 640). Each of these transactions will typically have at least a hash associated with it. The blockchain-based accounts can compare these hashes utilized in the unconfirmed transactions against the previously determined hashes associated with the one or more blockchain-based accounts of the user (block 650).

The comparisons can be done against previously stored and determined hashes. In some embodiments, the user will utilize the blockchain-based account to create more transactions. These new transactions also create transaction data and, in many cases, associated hashes that can be compared. The previously determined data, along with any new data, can be compiled in many embodiments as a list of valid transaction data. Thus, comparison of hashes may be accomplished by taking a new pending transaction and verifying if it is associated with a private key within the blockchain-based account, and if it is, checking to see if it is within the list of previously known or approved transactions.

Once a relevant hash has been acquired and compared, the process 600 can determine if the hashes match previously known or approved transactions (block 655). If there is a match, the process 600 can continue to scan the accessed blockchains for new unconfirmed transactions (block 640). However, if there is not a match between the hashes, then the process 600 can generate a notification of a potential compromise to the user of the blockchain-based account associated with the compared/compromised hash and associated private key (block 660). Those skilled in the art will recognize that the type of notification and the method of generation can vary based on the circumstances of the compromise and/or the availability of the network and/or devices that can be used to notify the user.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method, comprising:
    securely storing, in a blockchain-compatible wallet, a private key associated with a blockchain;
    determining one or more transactions associated with the stored private key;
    storing, in the blockchain-compatible wallet, transaction data related to the determined one or more transactions;
    accessing the blockchain associated with the private key;
    monitoring new transactions on the accessed blockchain;
    detecting, by the blockchain-compatible wallet, one or more potential compromises to the private key using the transaction data stored in the blockchain-compatible wallet; and
    generating, in response to a detected potential compromise, a notification that the private key is potentially compromised.

2. The method of claim 1, wherein the transaction data includes a hash associated with each transaction.

3. The method of claim 1, wherein the monitoring includes evaluating unconfirmed transactions on the accessed blockchain.

4. The method of claim 1, wherein the detecting comprises comparing unconfirmed transactions against the stored transaction data.

5. The method of claim 4, wherein the comparison utilizes a bloom filter.

6. The method of claim 5, wherein a random value is incorporated into the values compared within the bloom filter.

7. The method of claim 1, wherein the blockchain-compatible wallet is a hardware wallet.

8. A device, comprising:
    one or more processors;
    at least one memory;
    a network connection; and
    an application stored in the at least one memory, and upon execution, configured to direct the one or more processors, individually or in combination, to:
        securely store, in the at least one memory, a plurality of keys associated with at least one cryptocurrency account;
        store, in the at least one memory, transaction data related to one or more transactions associated with the plurality of keys;
        utilize the network connection to access one or more blockchains;

detect one or more potential compromises to the at least one cryptocurrency account using the stored transaction data and one or more unconfirmed blockchain transactions from the accessed one or more blockchains; and generate a notification that the at least one cryptocurrency account is potentially compromised.

9. The device of claim 8, wherein the generated notification is transmitted to and displayed on a portable computing device.

10. The device of claim 8, wherein the device is configured to use the stored plurality of keys to generate one or more digital signatures for the one or more transactions.

11. The device of claim 8, wherein the stored transaction data includes a hash for each transaction of the one or more transactions.

12. The device of claim 8, wherein execution of the application further directs the one or more processors, individually or in combination, to detect one or more potential compromises to the at least one cryptocurrency account by comparing the one or more unconfirmed blockchain transactions to a stored transaction data.

13. The device of claim 12, wherein an unconfirmed blockchain transaction utilizing a hash not matching previously-generated hashes for the one or more transactions is configured to trigger the generation of the notification that the at least one cryptocurrency account is potentially compromised.

14. A method, comprising:
securely storing, within a hardware wallet, at least one key associated with at least one cryptocurrency account;

storing, in the hardware wallet, transaction data related to one or more transactions associated with the at least one key;

utilizing a network connection within the hardware wallet to access one or more blockchains;

detecting, by the hardware wallet, one or more potential compromises to the at least one cryptocurrency account by comparing unconfirmed blockchain transactions accessed from the one or more blockchains to the stored transaction data; and generating, by the hardware wallet, a notification that the at least one cryptocurrency account is potentially compromised in response to detecting the one or more potential compromises to the at least one cryptocurrency account.

15. The method of claim 14, wherein the stored transaction data includes a hash for each of the one or more transactions.

16. The method of claim 14, wherein an unconfirmed blockchain transaction utilizing a hash not matching previously-generated hashes for the one or more transactions triggers the generation of the notification that the at least one cryptocurrency account is potentially compromised.

17. The method of claim 1, further comprising storing the transaction data in a hash table of the blockchain-compatible wallet.

18. The device of claim 8, wherein execution of the application further directs the one or more processors, individually or in combination, to store the transaction data in a hash table in the at least one memory.

19. The method of claim 14, further comprising storing the transaction data in a hash table of the hardware wallet.

20. The device of claim 12, wherein the comparison utilizes a bloom filter.

* * * * *